US012653084B2

(12) United States Patent
da Silva et al.

(10) Patent No.: US 12,653,084 B2
(45) Date of Patent: Jun. 16, 2026

(54) ADJUSTABLE TOOLBAR ASSEMBLY FOR AN AGRICULTURAL PLANTING IMPLEMENT

(71) Applicant: CNH Industrial Brasil Ltda., Nova Lima (BR)

(72) Inventors: Regis Carlos Pereira da Silva, Piracicaba (BR); Leonardo Reis Menezes, Piracicaba (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 400 days.

(21) Appl. No.: 18/222,875

(22) Filed: Jul. 17, 2023

(65) Prior Publication Data

US 2024/0057500 A1      Feb. 22, 2024

(51) Int. Cl.
| | | |
|---|---|---|
| *A01B 63/32* | (2006.01) | |
| *A01B 63/00* | (2006.01) | |
| *A01B 79/00* | (2006.01) | |

(52) U.S. Cl.
CPC ............ *A01B 63/32* (2013.01); *A01B 63/008* (2013.01); *A01B 79/00* (2013.01)

(58) Field of Classification Search
CPC ............ A01B 63/28–32; A01B 63/008; A01B 79/00–02
See application file for complete search history.

(56) References Cited

U.S. PATENT DOCUMENTS

| | | |
|---|---|---|
| 6,378,619 B2 | 4/2002 | Mayerle et al. |
| 10,251,334 B2 | 4/2019 | Jagow |
| 2020/0084951 A1 | 3/2020 | Fanshier et al. |
| 2022/0053685 A1* | 2/2022 | Maro ................... A01B 63/008 |

FOREIGN PATENT DOCUMENTS

| | | |
|---|---|---|
| CN | 2034762 U | 3/1989 |
| CN | 107896577 B | 7/2020 |
| DE | 102006034798 B4 | 2/2014 |
| WO | 2009134144 A1 | 11/2009 |

* cited by examiner

*Primary Examiner* — Tara Mayo
(74) *Attorney, Agent, or Firm* — Fletcher Yoder, P.C.

(57)      ABSTRACT

An adjustable toolbar system for an agricultural implement including a linkage assembly configured to be positioned between a main frame of a toolbar and a row unit, an actuator configured to couple to the main frame of the toolbar and to the linkage assembly, a sensor configured to generate a signal indicative of a down pressure applied by the row unit to a soil surface during planting operations, and a controller configured to output control signals to the actuator based on the signal to adjust the down pressure applied by the row unit to the soil surface during the planting operations.

19 Claims, 6 Drawing Sheets

200

202
RECEIVE FIRST SIGNAL INDICATIVE
OF DESIRED PRESSURE

204
STORE DESIRED PRESSURE

206
RECEIVE SECOND SIGNAL INDICATIVE OF
ACTUAL DETECTED PRESSURE MEASUREMENT

208
DOES THE
ACTUAL DETECTED
PRESSURE MEASUREMENT
CORRESPOND TO THE
STORED DESIRED
PRESSURE
?

YES

NO

210
OUTPUT A CONTROL SIGNAL TO AN ACTUATOR
OF AN ADJUSTABLE TOOLBAR ASSEMBLY

ADJUSTABLE TOOLBAR ASSEMBLY FOR AN AGRICULTURAL PLANTING IMPLEMENT

CROSS-REFERENCE TO RELATED APPLICATION

This application claims priority from and the benefit of Brazilian Application No. 10 2022 016636-6, entitled "Adjustable Toolbar Assembly for an Agricultural Planting Implement," filed Aug. 19, 2022, which is hereby incorporated by reference in its entirety.

BACKGROUND

The present disclosure relates generally to an adjustable toolbar assembly for an agricultural planting implement.

Generally, planting implements (e.g., planters) are towed behind a tractor or other work vehicle via a mounting bracket secured to a rigid frame of the planting implement. Planting implements typically include multiple row units distributed across a width of the planting implement. In certain planting implements, at least a portion of the row units may be shifted from a working position to a non-working position (e.g., headland position, transport position). When in the working position, each row unit is configured to deposit agricultural product (e.g., seed, fertilizer) at a desired depth beneath the soil surface of a field, thereby establishing rows of planted agricultural product. For example, each row unit typically includes a ground engaging tool or opener that forms a path (e.g., trench) for agricultural product deposition into the soil. An agricultural product conveying system (e.g., seed tube or powered agricultural product conveyor) is configured to deposit the agricultural product into the trench. The opener/agricultural product conveying system may be followed by closing discs that move displaced soil back into the trench and/or a packer wheel that packs the soil on top of the deposited agricultural product.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an adjustable toolbar system for an agricultural implement includes a linkage assembly positioned between a main frame of a toolbar and a row unit, an actuator coupled to the main frame of the toolbar and to the linkage assembly, a sensor configured to generate a signal indicative of a down pressure applied by the row unit to a soil surface during planting operations, and a controller configured to output control signals to the actuator based on the signal to adjust the down pressure applied by the row unit to the soil surface during the planting operations.

In certain embodiments, a method of operating an adjustable toolbar system includes receiving, at one or more processors, a signal indicative of a down pressure applied by a row unit to a soil surface during planting operations, determining, using the one or more processors, that the down pressure does not correspond to a desired down pressure target, and outputting, using the one or more processors, control signals to an actuator in response to determining that the down pressure does not correspond to the desired down pressure target. The control signals cause the actuator to exert a force on a linkage assembly positioned between a main frame of an agricultural implement and a toolbar frame that is rotatably coupled to the row unit, and the force on the linkage assembly adjusts the linkage assembly to change the down pressure applied by the row unit to the soil surface during the planting operations.

In certain embodiments, an adjustable toolbar system for an agricultural implement includes a linkage assembly positioned between a main frame of a toolbar and a toolbar frame that couples to a row unit. The linkage assembly includes at least one upper medial arm rotatably coupled to the main frame and to the toolbar frame, at least one lower medial arm rotatably coupled to the main frame and to the toolbar frame, at least one interior medial arm that is rigidly coupled to the at least one lower medial arm and that is slidingly coupled to the toolbar frame, and an actuator coupled to the main frame and to the linkage assembly. The actuator applies a force to the linkage assembly to adjust a down pressure applied by the row unit to a soil surface during planting operations.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
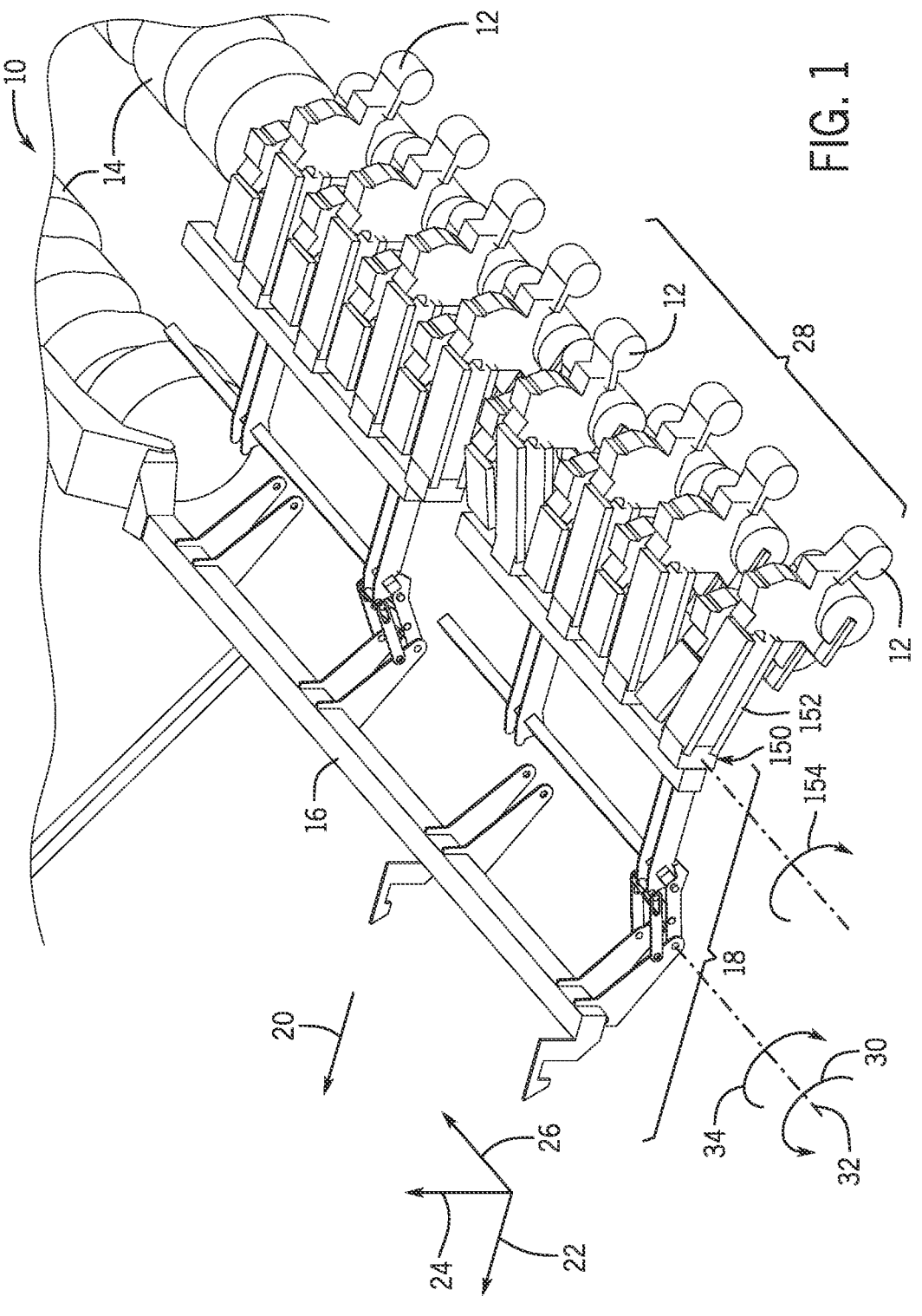
FIG. 1 is a perspective view of a portion of an agricultural planting implement having an adjustable toolbar assembly and multiple row units distributed across a width of the agricultural planting implement, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Planting implements typically include at least one toolbar configured to support multiple row units. For example, certain planting implements have multiple toolbars extending from a main frame. Each toolbar may be pivotally coupled to the main frame, and each toolbar may support multiple row units. In particular, the multiple row units may be distributed along a length of each toolbar. During planting operations, the at least one toolbar may be rotated/oriented to place the multiple row units in a working position, which may enable the multiple row units to engage with a surface of a field. Additionally, the at least one toolbar may be rotated/oriented to place the multiple row units in a non-working position, which may enable the multiple row units to be disengaged from the surface of the field for a headland turn or transport of the planting implement from the field.

Furthermore, each row unit may be configured to be coupled to the at least one toolbar by a row unit linkage assembly that enables vertical movement of each row unit in response to variations in the surface of the field. Thus, the planting implement may maintain a certain desired down pressure (e.g., force, load) of each row unit in relation to the surface of the field. However, in typical planting implements without features of the disclosed embodiments, the vertical movement of each row unit permitted by the row unit linkage assembly may not provide sufficient stroke (e.g., movement, flux, displacement) to ensure the desired down pressure across the variations in the surface of the field, and therefore potentially cause uneven distribution (e.g., deposition) of agricultural product over the surface of the field. The variations in the surface of the field may include protrusions (e.g., peaks, hills, ridges) and depressions (e.g., valleys, channels, grooves, trenches). In addition, the variations in the surface of the field may also be affected by the composition and/or conditions of the soil, such as variations in density (e.g., loosely packed or compacted), variations in soil particle size, and/or moisture content of the soil (e.g., wet or dry). Therefore, it is now recognized that an improved adjustable toolbar assembly that provides sufficient control over the down pressure of the row units, as well as folding of the row units into the non-working position, is desirable for agriculture planting implements.

FIG. 1 is a perspective view of a portion of an embodiment of an agricultural implement 10 (e.g., planting implement) having multiple row units 12 distributed across a width of the agricultural implement 10. The agricultural implement 10 also includes main wheel assemblies 14, a main frame 16, and one or more adjustable toolbar assemblies 18. The main wheel assemblies 14 are configured to support at least a portion of the weight of the main frame 16, the one or more adjustable toolbar assemblies 18, the row units 12, agricultural product storage tank(s), agricultural product (e.g., seed, fertilizer) within the agricultural product storage tank(s), and other components of the agricultural implement 10. The agricultural implement 10 is configured to be towed through a field behind a work vehicle, such as a tractor, in a forward direction of travel 20. As illustrated, the agricultural implement 10 includes the main frame 16, which includes a hitch configured to couple the agricultural implement 10 to an appropriate tractor hitch (e.g., via a ball, clevis, or other coupling).

The main frame 16 is coupled to the one or more adjustable toolbar assemblies 18, which support the multiple row units 12. Furthermore, each row unit 12 may include one or more opener discs configured to form a path (e.g., trench) within soil of the field. The row unit 12 may also include an agricultural product conveying system (e.g., seed tube or powered agricultural product conveyer) configured to deposit the agricultural product into the path/trench. In addition, the row unit 12 may include closing disc(s) and/or a packer wheel positioned behind the agricultural product conveying system. The closing disc(s) are configured to move displaced soil back into the path/trench, and the packer wheel is configured to pack soil on top of the deposited agricultural product. Furthermore, the row unit 12 may include an agricultural product meter configured to control a flow of the agricultural product into the agricultural product conveying system, thereby controlling agricultural product spacing within the soil. To facilitate discussion below, the agricultural implement 10 and its respective components may be described with reference to a longitudinal axis 22, a vertical axis 24, which is oriented relative to a direction of gravity, and a lateral axis 26. The longitudinal axis 22 may be generally aligned with the forward direction of travel 20.

In the illustrated embodiment, the multiple row units 12 form segments of row units 28, wherein each of the segments of row units 28 is attached to the main frame 16 via a corresponding one of the one or more adjustable toolbar assemblies 18. Thus, each segment of row units 28 may be controllably adjusted independently of each other. For example, each segment of row units 28 may be rotated upwardly about the lateral axis 26 from the illustrated working position to a non-working position (e.g., headland position, transport position). In some embodiments, at least a portion of the multiple adjustable toolbar assemblies 18 may be rotated in a first rotational direction 30 about a first axis of rotation 32 that is substantially parallel to the lateral axis 26, thereby rotating the respective segments of row units 28 coupled to the portion of the multiple adjustable toolbar assemblies 18 from the working position to the non-working position. Alternatively, in some embodiments, at least a portion of the multiple adjustable toolbar assemblies 18 may be rotated in a second rotational direction 34 about the first axis of rotation 32 (e.g., opposite the first rotational direction 30), thereby rotating the respective segments of row units 28 coupled to the portion of the multiple adjustable toolbar assemblies 18 from the non-working position to the working position. As a result, the row units 12 are positioned to engage the soil, thereby enabling the row units 12 to deposit the agricultural product within the soil as the agricultural implement 10 traverses the field. While the illustrated portion of the agricultural implement 10 includes eight row units 12 per segment of row units 28, in other embodiments, the agricultural implement may include more or fewer row units per segment of row units 28 (e.g., 3, 4, 5, 6, 10, 12, or more).

Figure 2:
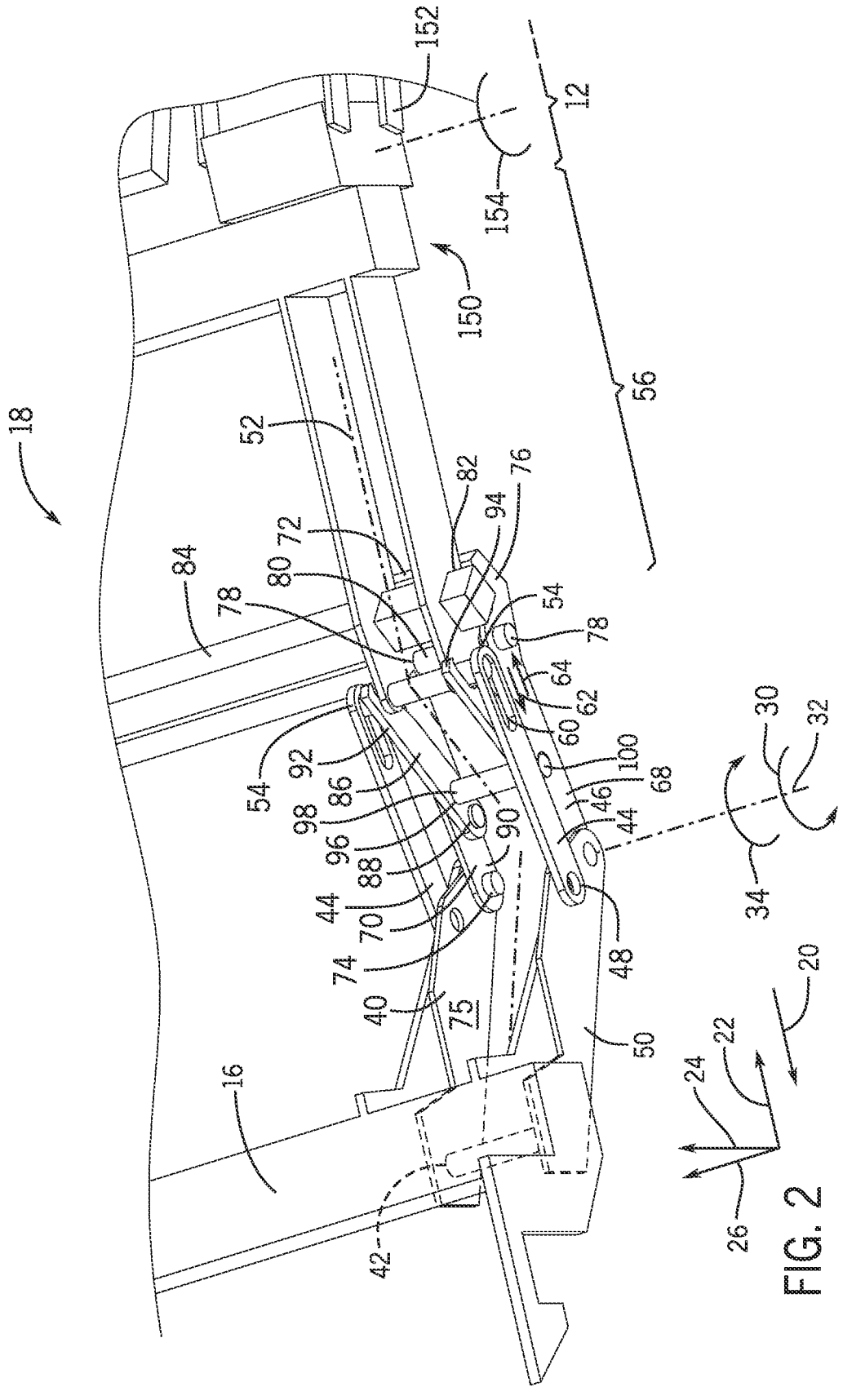
FIG. 2 is a perspective view of a portion of the adjustable toolbar assembly of FIG. 1, in accordance with an embodiment of the present disclosure.

FIG. 2 is a perspective view of a portion of one of the one or more adjustable toolbar assemblies 18 coupled to an extension of the main frame 16 of the agricultural implement 10 of FIG. 1. The adjustable toolbar assembly 18 includes a pair of first arms 40, which may be oriented substantially parallel to one another, and may be rigidly coupled to the main frame 16. In particular, the pair of first arms 40 may be directly coupled to the main frame 16 via one or more fasteners (e.g., bolts, screws, rivets) or by a welding process. A first cross support 42 (e.g. first pin) may extend between the pair of first arms 40 to reinforce the pair of first arms 40. In some embodiments, the first cross support 42 and the pair of first arms 40 may be separate components coupled to one another via fasteners (e.g., bolts, screw, rivets) or by a welding process. Additionally, in other embodiments, the pair of first arms 40 and the first cross support 42 may be formed as a single piece. Further, the pair of first arms 40 and the first cross support 42 may be integrally formed with the extension of the main frame 16 (e.g., considered part of the main frame 16). In the illustrated embodiment, the first cross support 42 and a portion of the pair of first arms 40 are hidden from view by the main frame 16, and are represented by a dashed outline.

Figure 5:
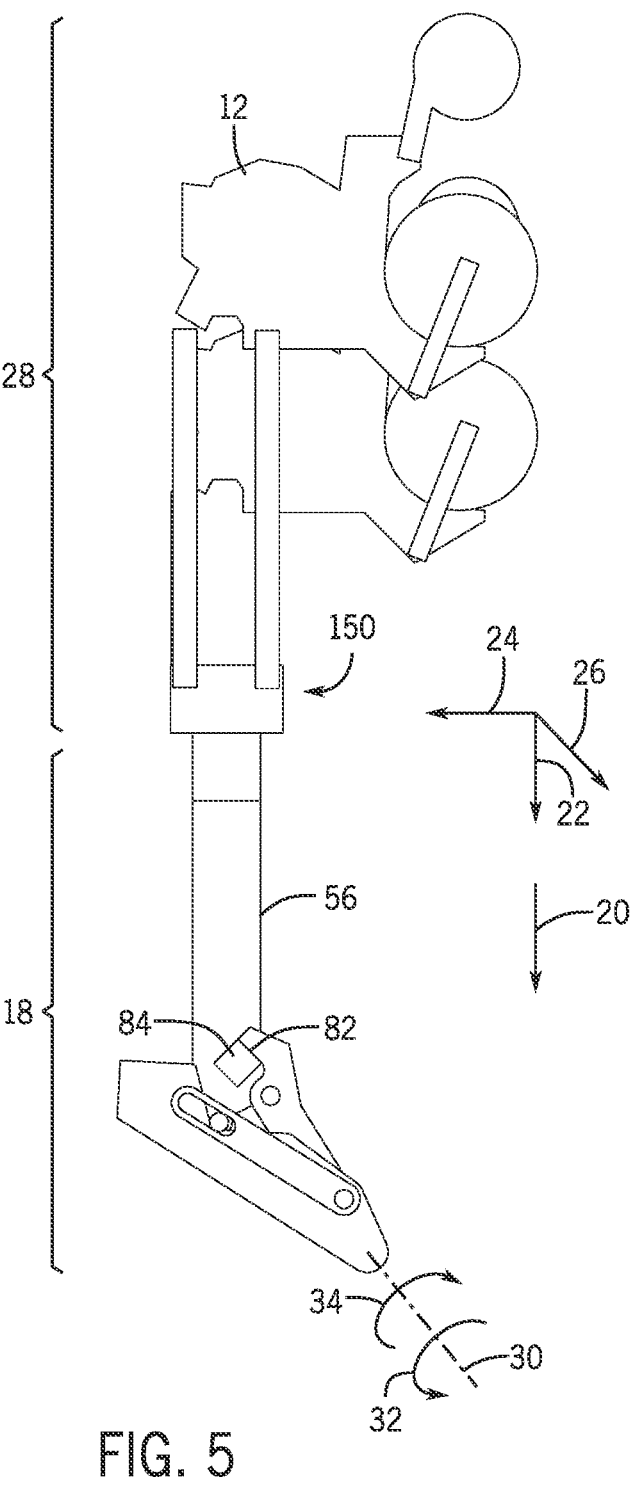
FIG. 5 is a side view of the adjustable toolbar assembly of FIG. 1, wherein the toolbar is in a non-working position, in accordance with an embodiment of the present disclosure.

Furthermore, in the illustrated embodiment, the adjustable toolbar assembly 18 also includes a pair of upper medial arms 44 that are substantially parallel to and set apart from a lower medial arm 46 (e.g., separated along the vertical axis 24). The pair of upper medial arms 44 each includes a first end 48 (e.g., end portion) that is rotatably coupled to and extends from an outside surface 50 of the extension of the main frame 16, relative to a midline 52. Further, the pair of upper medial arms 44 may be rotatably coupled to and extend from the pair of first arms 40. Additionally, the pair of upper medial arms 44 each includes a second end 54 (e.g., end portion) rotatably coupled to a toolbar frame 56 via a second pin 58 that extends between the pair of upper medial arms 44 (e.g., substantially perpendicular and/or transverse to the pair of upper medial arms 44). In particular, as shown in the illustrated embodiment, the toolbar frame 56 may be coupled to the second pin 58, such as within (e.g., between, inside) the points at which second ends 54 of the pair of upper medial arms 44 couple to the second pin 58, relative to the midline 52. Additionally, the second ends 54 each include an elongated slot 60 through which the second pin 58 may extend and travel (e.g., forming a key-slot interface). For example, when the segment of row units 28 is either rotated in the first rotational direction 30 or rotated in the second rotational direction 34 about the first axis of rotation 32, the second pin 58 may slide (e.g., translate) within (e.g., along, inside) the elongated slots 60 of the second ends 54 in a first direction 62 or a second direction 64, respectively. In this way, the movement of the second pin 58 within each of the elongated slots 60 of the pair of upper medial arms 44 may guide the movement of the adjustable toolbar assembly 18 from the working position to the non-working position, or vice versa. In addition, the pair of upper medial arms 44 may enable the adjustable toolbar assembly 18 to be locked in a substantially raised and/or substantially vertical position, as shown in FIG. 5, relative to or extending along the vertical axis 24, when the segments of row units 28 are rotated into the non-working position.

As described herein, the adjustable toolbar assembly 18 also includes the lower medial arm 46 that is substantially parallel to and set apart from the pair of upper medial arms 44. Furthermore, the lower medial arm 46 may be configured in a substantially "U" shape having a first side 68 (e.g., a first lower medial arm portion) and a second side 70 (e.g., a second lower medial arm portion) that is substantially parallel to and set apart from the first side 68 (e.g., separated along the lateral axis 26). The lower medial arm 46 may also include a third side 72 that extends between and couples to respective ends of the first and second sides 68, 70. Specifically, each of the first and second sides 68, 70 of the lower medial arm 46 includes a first end 74 (e.g., end portion) that is rotatably coupled to the first arm 40. For example, the first ends 74 may extend from an inside surface 75 of the first arm 40, relative to the midline 52. Furthermore, each of the first and second sides 68, 70 of the lower medial arm 46 also includes a second end 76 that is coupled to opposite ends (e.g., end portions) of the third side 72. In the illustrated embodiment, the first, second, and third sides 68, 70, 72 of the lower medial arm 46 are formed as a single piece. However, in other embodiments, the first and second sides 68, 70 may be coupled to the third side 72 by fasteners or a weld.

Moreover, the lower medial arm 46 is coupled to the toolbar frame 56 of the adjustable toolbar assembly 18. In particular, as shown in the illustrated embodiment, the toolbar frame 56 is coupled inside of (e.g., in between) the second ends 76 of the first and second sides 68, 70 of the lower medial arm 46, relative to the midline 52, as well as engaged on top of (e.g., above, atop) the third side 72 of the lower medial arm 46, relative to the vertical axis 24, when the toolbar frame 56 is in the working position. Specifically, as shown in the illustrated embodiment, each of the second ends 76 includes slots 78 through which a third pin 80 extends, thereby coupling the toolbar frame 56 to the second ends 76 of the lower medial arm 46.

Additionally, each of the second ends 76 also includes notches 82 that enable the lower medial arm 46 to engage with (e.g., contact) a first crossbar 84 of the toolbar frame 56 (e.g., to lift the toolbar frame 56). The notches 82 are open on one side (e.g., face upward generally away from the ground in the working position) to receive and engage the first crossbar 84. In this way, the lower medial arm 46 may support at least a portion of the weight of the toolbar frame 56 and the segment of row units 28 coupled to the toolbar frame 56, as discussed herein. Particularly, the lower medial arm 46 may enable the rotation of the toolbar frame 56 and thereby the segment of row units 28 from the working position to the non-working position, or vice versa. For example, when the segment of row units 28 is rotated from the working position into the non-working position, the lower medial arm 46 may enact a force upon the toolbar frame 56 causing the toolbar frame 56 and the coupled one or more segments of row units 28 to disengage from the surface of the soil and rotate in the first rotational direction 30 about the first axis of rotation 32. Furthermore, when rotating from the non-working to the working position, the lower medial arm 46 may initiate the rotation and support at least a portion of the weight of the toolbar frame 56 and the one or more segments of row units 28 as the toolbar frame 56 is lowered by rotation in the second rotational direction 34 about the first axis of rotation 32.

In the illustrated embodiment, the adjustable toolbar assembly 18 also includes a pair of interior medial arms 86 that are substantially parallel and set apart from each other (e.g., along the lateral axis 26). The pair of interior medial arms 86 each includes a first end 88 coupled to the lower medial arm 46, such as to an inside surface 90 of the lower medial arm 46, relative to the midline 52. The pair of interior medial arms 86 each includes a second end 92 coupled to the second pin 58. In particular, each of the second ends 92 of the pair of interior medial arms 86 is coupled to the second pin 58, such as inside of the point at which the pair of upper medial arms 44 are rotatably coupled to the second pin 58 and outside of the point at which the toolbar frame 56 is coupled to the second pin 58, relative to the midline 52.

Specifically, as shown in the illustrated embodiment, each of the second ends 92 of the pair of interior medial arms 86 are coupled to the second pin 58 in between the pair of upper medial arms 44 and the toolbar frame 56. Additionally, each of the second ends 92 of the pair of interior medial arms 86 includes an elongated notch 94 that may travel (e.g., slide, translate) along the second pin 58 (e.g., forming a key-slot interface). For example, when the segment of row units 28 is either rotated in the first rotational direction 30 or rotated in the second rotational direction 34 about the first axis of rotation 32, each of the elongated notches 94 may slide (e.g., translate) along the second pin 58. As shown, the elongated notches 94 are open on one side (e.g., face downward generally toward the ground in the working position) to receive and engage the second pin 58.

In addition, the pair of interior medial arms 86 may enable the adjustable toolbar assembly 18 to be locked in a position that is substantially parallel to the soil surface, when the segments of row units 28 are rotated into the working position. Moreover, the pair of interior medial arms 86 are coupled to a fourth pin 96 that extends between the pair of interior medial arms 86 (e.g., substantially perpendicular and/or transverse to the pair of interior medial arms 86). For example, the pair of interior medial arms 86 may each include a slot 98 that may enable the fourth pin 96 to extend through each of the slots 98. In other embodiments, the fourth pin 96 may be rigidly coupled to the pair of interior medial arms 86, such as by fasteners or by a welding process. Furthermore, in another embodiment, the pair of interior medial arms 86 and the fourth pin 96 may be formed as a single piece. Moreover, as in the illustrated embodiment, the fourth pin 96 also extends through an additional slots 100 positioned in the lower medial arm 46 (e.g., on the first and second sides 68, 70; rigidly coupled), thereby coupling (e.g., rigidly coupling) the interior medial arms 86 to the lower medial arm 46 by way of the fourth pin 96 (e.g., at a middle portion of the lower medial arm 46). Together, the various arms and pins may form a linkage assembly (e.g., pantographic linkage assembly) of the adjustable toolbar assembly 18. Thus, instead of the main frame 16 being rigidly coupled to the toolbar frame 56, the linkage assembly is provided between the main frame 16 and the toolbar frame 56 (as well as the row units 12) to provide additional axes of rotation for adjustment of down pressure and/or position (e.g., a working position to a non-working position). Together, the structural components (e.g., the row units 12 and the adjustable toolbar assembly 18) and the control components (e.g., controller 126, the user interface 136, the sensor 142) described herein form an adjustable toolbar system for the agricultural implement 10 of FIG. 1.

Figure 3:
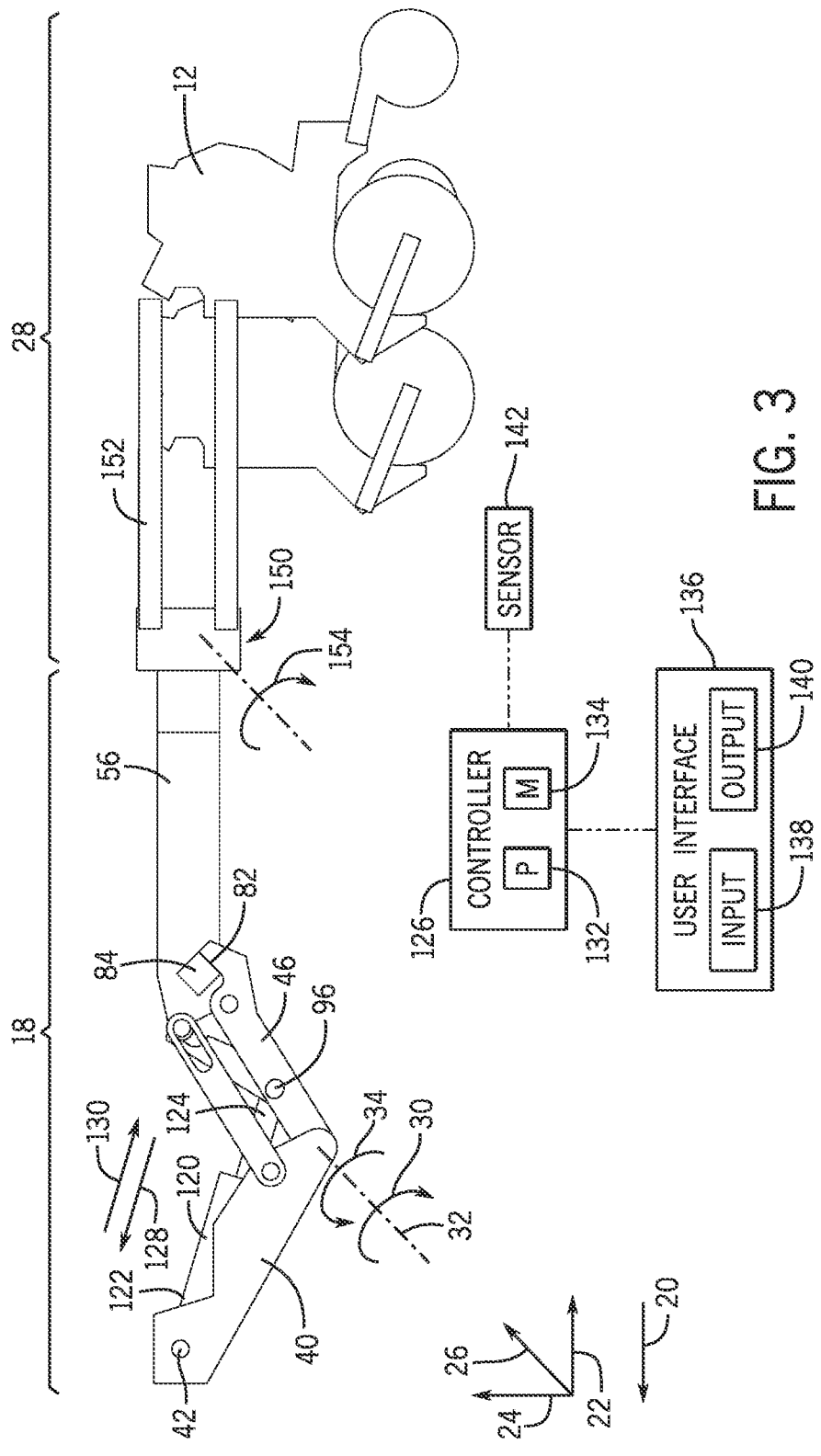
FIG. 3 is a side view of the adjustable toolbar assembly of FIG. 1, wherein the toolbar is in a working position, in accordance with an embodiment of the present disclosure.
Figure 4:
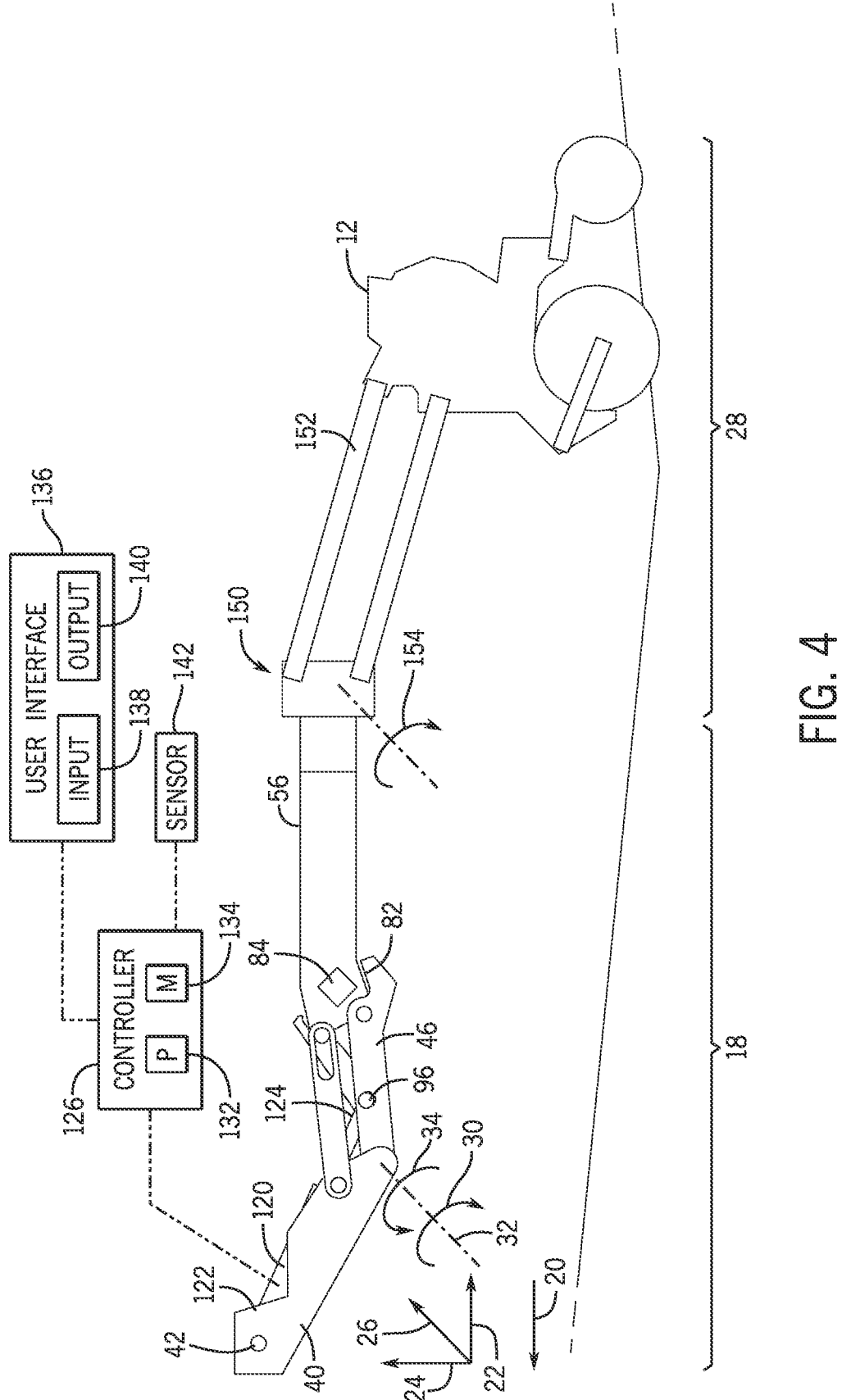
FIG. 4 is a side view of the adjustable toolbar assembly of FIG. 1, wherein the toolbar is in a working position with additional down pressure via the adjustable toolbar assembly, in accordance with an embodiment of the present disclosure.

FIG. 3 is a schematic diagram of the adjustable toolbar assembly 18, wherein the toolbar frame 56 and the respective segment of row units 28 are in a working position (e.g., to engage a surface of a field). FIG. 4 is a schematic diagram of the adjustable toolbar assembly 18, wherein the toolbar frame 56 and the respective segment of row units 28 are in the working position, with additional down pressure applied via the adjustable toolbar assembly 18. FIG. 5 is a schematic diagram of the adjustable toolbar assembly 18 of FIG. 2, wherein the toolbar frame 56 and the respective segment of row units 28 are in a non-working position (e.g., to separate from the surface of the field).

In the illustrated embodiment, the adjustable toolbar assembly 18 includes an actuator 120 (e.g. mechanical actuator, electro mechanical actuator, hydraulic actuator, pneumatic actuator, piezoelectric actuator) coupled to the first cross support 42 of the pair of first arms 40 at a first end 122 (e.g., end portion) of the actuator 120 and coupled to the fourth pin 96 that is coupled to and extends between the pair of interior medial arms 86 at a second end 124 (e.g., end portion) of the actuator 120. The adjustable toolbar assembly 18 also includes or is coupled to a controller 126. The controller 126 may send output signals (e.g., control signals) to various components of the agricultural implement 10. The controller 126 may be coupled to any suitable portion of the agricultural implement 10 (e.g., the main frame), to the work vehicle towing the agricultural implement, to another suitable structure, or a combination thereof (e.g., the controller 126 may be distributed among multiple controller sections). In the illustrated embodiment, the controller 126 is communicatively coupled to the actuator 120. In particular, the controller 126 may output signals wirelessly or by wired circuitry that selectively instruct the actuator 120 to rotate (e.g. drive) the adjustable toolbar assembly 18 upwardly in the first rotational direction 30 about the axis of rotation 32 (e.g., from the working position to the non-working position). In addition, the controller 126 may output signals to selectively instruct the actuator 120 to rotate the adjustable toolbar assembly 18 downwardly in the second rotational direction 34 about the axis of rotation 32 (e.g., from the non-working position to the working position). In this way, the controller 126 may selectively lift or lower the segments of row units 28 independently of each other. Furthermore, the controller 126 may output signals to partially rotate the adjustable toolbar assembly 18, thereby lifting or lowering the segments of row units 28 to maintain a desired down pressure of each row unit 12 in relation to the surface of the field.

Specially, in the illustrated embodiment, the controller 126 outputs signals that cause the second end 124 of the actuator 120 to exert a force (e.g., retract to exert a pulling force; extend to exert a pushing force) upon the fourth pin 96 causing the fourth pin 96 to move (e.g. translate, travel) in a first direction 128 or a second direction 130 relative to the first cross support 42 of the pair of first arms 40 (and thus, relative to the main frame 16 shown in FIG. 1). In turn, when the fourth pin 96 moves in the first direction 128, the fourth pin 96, which is coupled to the lower medial arm 46, exerts a pulling force on the lower medial arm 46, which then lifts (e.g. raises, rotates, elevates) the toolbar frame 56 via engagement between the notches 82 and the first cross-bar 84 of the toolbar frame 56. In this way, the toolbar frame 56 and the respective segment of row units 28 may be rotated from the working position shown in FIG. 3 to the non-working position shown in FIG. 5. Furthermore, the toolbar frame 56 and the respective segments of row units 28 may be selectively rotated in this manner (e.g., by controlling the actuator 120 to move the fourth pin 96 in the first direction 128) at varying degrees of rotation to control the down pressure of the respective segments of row units 28 on the surface of the soil (e.g., decrease the force applied via the actuator 120 to maintain the down pressure at a desired down pressure target, such as within a desired down pressure target range), as represented by the change in the working position of FIG. 4 to FIG. 3. Indeed, FIG. 3 may be considered to be a retracted working position and FIG. 4 may be considered to be an extended working position (e.g., with additional down pressure applied via the adjustable toolbar assembly 18, as compared to the retracted working position).

In addition, when the fourth pin 96 moves in the second direction 130, the fourth pin 96 exerts a pushing force on the lower medial arm 46, which then lowers (e.g. rotates, drops, lets down) the toolbar frame 56. In this way, the toolbar frame 56 and the respective segment of row units 28 may be rotated from the non-working position shown in FIG. 5 to the working position shown in FIGS. 3 and 4. Furthermore, the toolbar frame 56 and the respective segments of row units 28 may be selectively rotated in this manner (e.g., by controlling the actuator 120 to move the fourth pin in the second direction 130) at varying degrees of rotation to control the down pressure of the respective segments of row units 28 on the surface of the soil (e.g., increase the force applied via the actuator 120 to maintain the down pressure at the desired down pressure target, such as within the desired down pressure target range), as represented by the change in the working position of FIG. 3 to FIG. 4.

It should be appreciated that the techniques may not be applied to each row unit individually. Instead, for a machine section that includes multiple row units, such as one segment of row units 28, a sum of the down pressure (e.g., sum of all forces) of the multiple row units may be controllably adjusted to meet the desired down pressure target. For example, when some row units in the segment of row units 28 pass over a depression in the surface of the soil, the sum of the down pressure of all row units in the segment of row units 28 may drop (e.g., decrease, reduce) below the desired down pressure target. In response, the controller 126 may output signals to the actuators 120 of the adjustable toolbar assembly 18 to cause the actuators 120 to increase the pushing force on the toolbar frames 56 by way of the fourth pin 96, as discussed therein. As a result, the sum of the down pressure of the multiple row units in the segment of row units 28 may increase and/or return to the desired down pressure target. In turn, when some row units in the segment of row units 28 pass over a hill in the surface of the soil, the sum of the down pressure of all row units in the segment of row units 28 may rise (e.g., increase) above the desired down pressure target. In response, the controller 126 may output signals to the actuators 120 of the adjustable toolbar assembly 18 to cause the actuators 120 to increase the pulling force on the toolbar frames 56 by way of the fourth pin 96, as discussed therein. As a result, the sum of the down pressure of the multiple row units in the segment of row units 28 may decrease and/or return to the desired down pressure target. As noted herein, the desired down pressure target may be established (e.g., by the operator, such as based on soil conditions).

In certain embodiments, the controller 126 is an electronic controller having electrical circuitry configured to output signals to control the actuator 120. In the illustrated embodiment, the controller 126 includes a processor 132 and a memory 134. The controller 126 may also include one or more storage devices, communication devices, and/or other suitable components. The processor 132 may be used to execute software, such as software for controlling the actuator 120, and so forth. Moreover, the processor 132 may include multiple microprocessors, one or more "general-purpose" microprocessors, one or more special-purpose microprocessors, and/or one or more application specific integrated circuits (ASIC s), or some combination thereof. For example, the processor 132 may include one or more reduced instruction set (RISC) processors.

The memory 134 may include a volatile memory, such as random access memory (RAM), and/or a nonvolatile memory, such as read-only memory (ROM). The memory 134 may store a variety of information and may be used for various purposes. For example, the memory 134 may store processor-executable instructions (e.g., firmware or software) for the processor 132 to execute, such as instructions to output signals that control the actuator 120, and so forth.

The storage device(s) (e.g., nonvolatile storage) may include ROM, flash memory, a hard drive, or any other suitable optical, magnetic, or solid-state storage medium, or a combination thereof. The storage device(s) may store data (e.g., the desired down pressure target), instructions (e.g., software or firmware for controlling the actuator 120, etc.), and any other suitable data.

In the illustrated embodiment, a user interface 136 is communicatively coupled to the controller 126. The user interface 136 is configured to receive input from an operator (e.g., a human operator) and to provide information to the operator. The user interface 136 may include any suitable input device(s) 138 for receiving input, such as a keyboard, a mouse, touch screen(s), button(s), switch(es), knob(s), other suitable input device(s) 138, or any combination thereof. In addition, the user interface 136 may include any suitable output device(s) 140 for presenting information to the operator, such as speaker(s), indicator light(s), display (s), other suitable output device(s), or any combination thereof. For example, the user interface 136 may enable the operator to provide inputs to set the desired down pressure target and/or to control the actuator 120. Additionally or alternatively, the user interface 136 may present the desired down pressure target, a current down pressure, an indication of whether the current down pressure meets the desired down pressure target (e.g., within the desired down pressure target range), an indication of a current position of the adjustable toolbar assembly 18 (e.g., working position or non-working position), and/or a current control instruction being sent to the actuator 120 (e.g., to extend to increase the down pressure, to retract to decrease the down pressure, to extend to reach the working position, to retract to reach the non-working position).

In the illustrated embodiment, the controller 126 is communicatively coupled to a sensor 142. The sensor 142 may output signals wirelessly to the controller 126; however, wired circuitry may be included. The sensor 142 may send signals (e.g., data) to the controller 126, and the signals may be indicative of various conditions or parameters related to operation of the adjustable toolbar assembly 18. In particular, the sensor 142 may be a pressure sensor (e.g., strain gauge, load cell) positioned along a structure of the adjustable toolbar assembly 18 and/or the row unit 12. The sensor 142 sends signals (e.g., data) to the controller 126, and the signals may be indicative of a strain on the structure of the adjustable toolbar assembly 18 and/or the row unit 12, which in turn reflects the down pressure applied to the surface of the soil. Based on the signals, the controller 126 may then output signals to the actuator 120 to adjust (e.g., increase or decrease) the detected pressure (or strain) at the sensor 142. The controller 126 may receive the signals and control the actuator 120 continuously (e.g., dynamically, responsively) as the adjustable toolbar assembly 18 travels through the field and/or as the row units 12 of the adjustable toolbar assembly 18 deliver agricultural materials to the field. In this way, the controller 126 may respond to the detected pressure (e.g., strain) to maintain the down pressure applied to the surface of the soil at the desired down pressure target during planting operations. It should be appreciated that the sensor 142 may represent one or more sensors, and further, it should be appreciated that multiple sensors may be distributed across the width of the adjustable toolbar assembly 18 (e.g., for different segments of row units 28)

With reference to FIGS. 1-5, it should be appreciated that the actuator 120 may supplement one or more other downforce sources, such as one or more downforce cylinders 150, that may be located between the toolbar frame 56 of the adjustable toolbar assembly 18 and the row units 12 (e.g., one downforce cylinder 150 per row unit 12 or per segment of row units 28). For example, the one or more downforce cylinders 150 may apply downforce to drive rotation of the row units 12 relative to the toolbar frame 56 and toward the surface of the soil. In particular, the one or more downforce cylinders 150 may drive rotation of row unit arms 152 (e.g., parallel arms) of the row units 12 about the toolbar frame 56, as shown by arrows 154. In such cases, the one or more downforce cylinders 150 may not be actively controlled (e.g., not extended or retracted via any control signals from the controller 126 or other controller; not dynamically controlled based on the signals from the sensor 142 or other sensor) during travel through the field and/or during the planting operations. Instead, the one or more downforce cylinders 150 may be set to some pressure level within the one or more downforce cylinders 150 (e.g., prior to the planting operations) that provides some level of downward force to the row units 12 during travel through the field and/or during the planting operations.

However, as noted herein, the one or more downforce cylinders 150 alone may not be sufficient to maintain the desired down pressure target during certain portions of the planting operations and/or across certain field conditions (e.g., varied terrain with many hills and dips). Thus, the adjustable toolbar assembly 18 positioned between the main frame 16 and the row units 12 may include the features disclosed herein (e.g., the sensor 142, the actuator 120, as well as the linkage assembly) that operate together to maintain the desired down pressure target during planting operations, as well as enable the adjustable toolbar assembly 18 to rotate (e.g., fold) between the working position shown in FIGS. 3 and 4 and the non-working position shown in FIG. 5. For example, the agricultural implement 10 may travel across generally level ground with the actuator 120 in a particular position, and the one or more downforce cylinders 150 apply sufficient downforce as the row units 12 rotate relative to the toolbar frame 56 to travel over small hills and dips. However, with reference to FIG. 4, even if the one or more downforce cylinders 150 are fully extended to drive the row units 12 toward the surface of the soil, the sensor 142 may detect that the down pressure does not correspond to the desired down pressure target (e.g., is insufficient or too low). Accordingly, the controller 126 may instruct the actuator 120 to drive the fourth pin 96 in the second direction 130. The linkage assembly transfers the force applied by the actuator 120 to the toolbar frame 56 to increase the down pressure on the surface of the soil.

Further, with reference to FIG. 3, even if the one or more downforce cylinders 150 are fully retracted to reduce the down pressure, the sensor 142 may detect that the down pressure does not correspond to the desired down pressure target (e.g., is too high). Accordingly, the controller 126 may instruct the actuator 120 to drive the fourth pin 96 in the first direction 128. The linkage assembly transfers the force applied by the actuator 120 to the toolbar frame 56 to decrease the down pressure on the surface of the soil.

Certain structural and operational features of the linkage assembly may be understood with reference to FIGS. 1-5. For example, the notches 82 of the lower medial arm engage the first crossbar 84 of the toolbar frame 56 to lift the toolbar frame 56 to decrease the down pressure on the surface of the soil (e.g., to move from the extended working position of FIG. 4 to the retracted working position of FIG. 3). Further, the second pin 58 travels within the elongated notches 94 of the pair of interior medial arms 86 to enable the linkage assembly to adjust the down pressure on the surface of the soil (e.g., the second pin 58 is at first/proximal ends of the elongated notches 94 in the extended working position of FIG. 4 and is at second/distal ends of the elongated notches 94 in the retracted working position of FIG. 3). Further, the pair of upper medial arms 44 and the lower medial arm 46 both rotate relative to the pair of first arms 40 (and thus, relative to the main frame 16) and remain substantially parallel to one another as the linkage assembly adjusts the toolbar frame 56 through certain positions (e.g., between the extended working position of FIG. 4 to the retracted working position of FIG. 3). However, the second pin 58 travels within the elongated slots 60 of the pair of upper medial arms 44 to enable the linkage assembly to reach the non-working position of FIG. 5 (e.g., the second pin 58 is at first/distal ends of the elongated slots 60 in the working positions of FIGS. 3 and 4 and is at second/proximal ends of the elongated slots 60 in the non-working position of FIG. 5). As shown, in the non-working position of FIG. 5 the pair of upper medial arms 44 and the lower medial arm 46 are no longer substantially parallel to one another.

Figure 6:
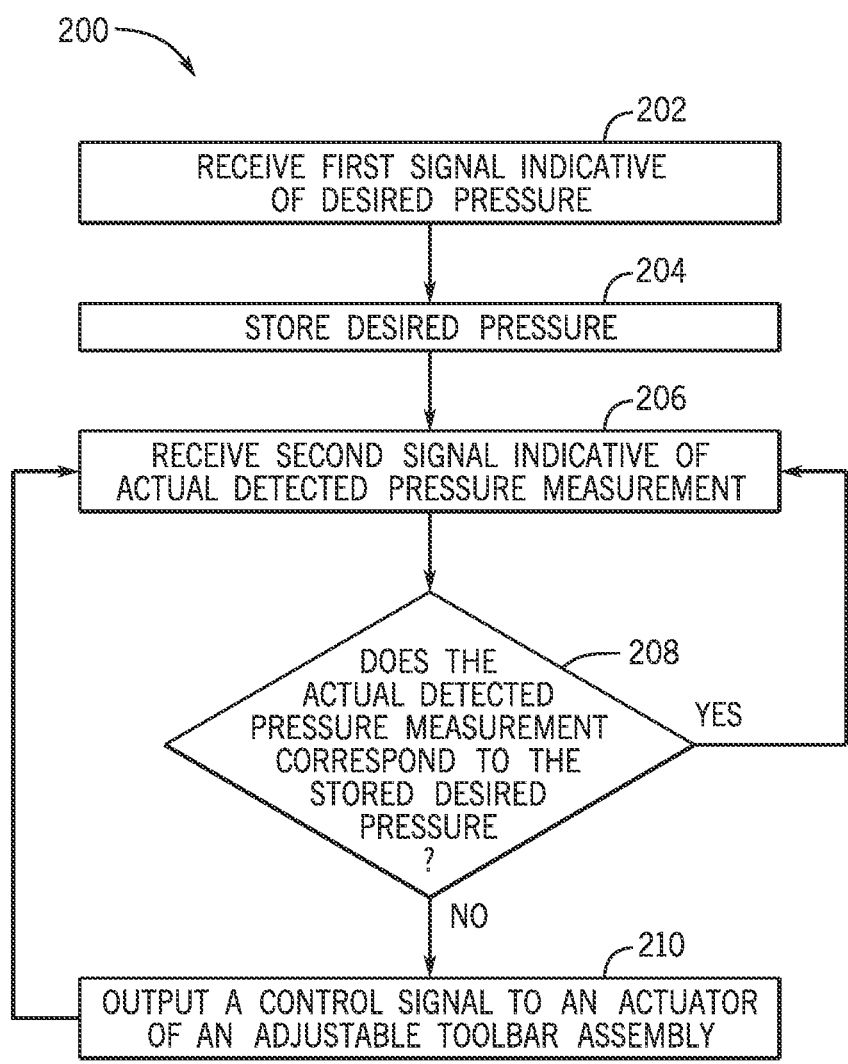
FIG. 6 is a flow diagram of an embodiment of a method for controlling the adjustable toolbar assembly of FIG. 1, in accordance with an embodiment of the present disclosure.

FIG. 6 is a flow diagram of an embodiment of a method 200 for controlling the adjustable toolbar assembly 18. The following description of the method 200 is described as being performed by a processing system (e.g., the controller 126), but it should be noted that any suitable processor-based device or system may be specially programmed to perform any of the methods described herein. Moreover, although the following description of the method 200 is described as including certain blocks performed in a particular order, it should be understood that the blocks of the method 200 may be performed in any suitable order, that certain blocks may be omitted, and/or that certain blocks may be added.

As represented by block 202, a first signal indicative of a desired pressure may be received (e.g., by the controller 126). The first signal indicative of the desired pressure may be received via input from the user interface 136 (e.g., by the operator). In another embodiment, the desired pressure may be established in some other way, such as by being pre-programmed into the controller 126 by a manufacturer. The desired pressure may be a pressure range.

The desired pressure may then be stored, at block 204, such as into the memory 134 of the controller 126. At block 206, a second signal indicative of an actual detected pressure measurement may be received (e.g., by the controller 126) from the sensor 142. Next, as represented by block 208, the actual detected pressure measurement may be compared to the stored desired pressure. In response to the actual detected pressure measurement corresponding to (e.g., matching; being within the pressure range), the method 200 may continue by returning to block 206. However, in response to the actual detected pressure measurement not corresponding to (e.g., not matching; being outside of the pressure range), the method 200 may continue by proceeding to block 210. In block 210, a control signal may be outputted (e.g., by the controller 126) to the actuator 120 of the adjustable toolbar assembly 18. The method 200 may operate with a feedback loop so that blocks 206-210 are carried out to maintain the actual detected pressure measurement at the stored desired pressure. In response to the actual detected pressure measurement being below the stored desired pressure, the control signal may contain instructions to extend the actuator 120, thereby increasing the actual detected pressure measurement until it corresponds to the stored desired pressure. In response to the actual detected pressure measurement being above the stored desired pressure, the control signal may contain instructions to retract the actuator 120, thereby decreasing the actual detected pressure measurement until it corresponds to the stored desired pressure. In this way, the controller 126 may operate the adjustable toolbar assembly 18 to maintain the actual detected pressure measurement at the desired pressure by adjusting the actuator 120 based on the signals from the sensor 142. This feedback and readjustment loop may be used by the controller 126 to controllably aid in maintaining the desired down pressure of the row units 12 of the agricultural implement 10 during travel through the field and/or during planting operations. In addition, the adjustable toolbar assembly 18, as discussed herein, provides the sufficient structure (e.g., the various arms, pins, and other structures as shown in the arrangement of FIGS. 1-4) to provide sufficient stroke to maintain the desired down pressure despite variations in the surface of the field, while also enabling rotation between the working position shown in FIGS. 3 and 4, as well as the non-working position shown in FIG. 5.

While only certain features have been illustrated and described herein, many modifications and changes will occur to those skilled in the art. It is, therefore, to be understood that the appended claims are intended to cover all such modifications and changes as fall within the true spirit of the disclosure. It should be appreciated that any of the features shown and described with reference to FIGS. 1-6 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . ." or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An adjustable toolbar system of an agricultural implement, the adjustable toolbar system comprising:
    a linkage assembly positioned between a main frame of a toolbar and a row unit;
    an actuator coupled to the main frame of the toolbar and to the linkage assembly;
    a sensor that generates a signal indicative of a down pressure applied by the row unit to a soil surface during planting operations; and
    a controller that outputs control signals to the actuator based on the signal to adjust the down pressure applied by the row unit to the soil surface during the planting operations;
    wherein the linkage assembly comprises a pair of upper medial arms being spaced apart from one another along a lateral axis and extending between the main frame of the toolbar and a toolbar frame of the toolbar; and
    wherein the toolbar frame of the toolbar is rotatably coupled to the row unit.

2. The adjustable toolbar system of claim 1, wherein the linkage assembly comprises a pin that couples the pair of upper medial arms to the toolbar frame; and
    wherein each upper medial arm of the pair of upper medial arms comprises a slot that slidingly receives the pin.

3. The adjustable toolbar system of claim 1, wherein the linkage assembly comprises a lower medial arm that comprises a first lower medial arm portion and a second medial arm portion being spaced apart from one another along the lateral axis and that each extend between the main frame and the toolbar frame.

4. The adjustable toolbar system of claim 3, wherein the pair of upper medial arms and the lower medial arm are rotatably coupled to the main frame and to the toolbar frame.

5. The adjustable toolbar system of claim 3, wherein the linkage assembly comprises a pair of interior medial arms being spaced apart from one another along the lateral axis and that each extend between the lower medial arm and the toolbar frame.

6. The adjustable toolbar system of claim 5, wherein the linkage assembly comprises a pin that couples the pair of upper medial arms to the toolbar frame and that is supported within a respective elongated notch of each interior medial arm of the pair of interior medial arms.

7. The adjustable toolbar system of claim 1, wherein the actuator comprises a hydraulic cylinder.

8. The adjustable toolbar system of claim 1, wherein the sensor comprises a strain gauge.

9. The adjustable toolbar system of claim 1, comprising:
    the row unit; and
    a downforce cylinder that couples the row unit to a toolbar frame of the toolbar;
    wherein the downforce cylinder drives the row unit toward the soil surface during the planting operations.

10. The adjustable toolbar system of claim 9, wherein the controller outputs the control signals to the actuator to supplement the downforce cylinder in maintaining the down pressure applied by the row unit to the soil surface during the planting operations at a desired down pressure target.

11. A method of operating an adjustable toolbar system, the method comprising:
    receiving, at one or more processors, a signal indicative of a down pressure applied by a row unit to a soil surface during planting operations;
    determining, using the one or more processors, that the down pressure does not correspond to a desired down pressure target; and
    outputting, using the one or more processors, control signals to an actuator in response to determining that the down pressure does not correspond to the desired down pressure target;
    wherein the control signals cause the actuator to exert a force on a linkage assembly positioned between a main frame of an agricultural implement and a toolbar frame that is rotatably coupled to the row unit; and
    wherein the force on the linkage assembly adjusts the linkage assembly to change the down pressure applied by the row unit to the soil surface during the planting operations.

12. The method of claim 11, further comprising:
    setting a pressure within a downforce cylinder positioned between the row unit and the toolbar frame; and
    driving the row unit toward the soil surface during the planting operations with the downforce cylinder.

13. The method of claim 12, wherein the outputting the control signals to the actuator comprises outputting the control signals that causes the actuator to exert the force on the linkage assembly to supplement the downforce cylinder in maintaining the down pressure applied by the row unit to the soil surface during the planting operations at the desired down pressure target.

14. The method of claim 11, wherein the linkage assembly comprises at least one upper medial arm rotatably coupled to the main frame and slidingly coupled to the toolbar frame via a key-slot interface; and wherein the method further comprises:

outputting, using the one or more processors, additional control signals to the actuator in response to determining that the agricultural implement should be transitioned from a working position to a non-working position, wherein the additional control signals cause the actuator in exerting an additional force on the linkage assembly, and wherein the additional force on the linkage assembly adjusts the key-slot interface that enables the agricultural implement to move from the working position to the non-working position.

15. The method of claim 11, wherein the linkage assembly comprises:

at least one upper medial arm and at least one lower medial arm that are each rotatably coupled to the main frame and to the toolbar frame, and at least one interior medial arm being rigidly coupled to the at least one lower medial arm and being slidingly coupled to the toolbar frame via a key-slot interface that enables the linkage assembly in changing the down pressure applied by the row unit to the soil surface during the planting operations.

16. An adjustable toolbar system of an agricultural implement, comprising:

a linkage assembly positioned between a main frame of a toolbar and a toolbar frame that couples to a row unit, wherein the linkage assembly comprises:

at least one upper medial arm rotatably coupled to the main frame and to the toolbar frame;

at least one lower medial arm rotatably coupled to the main frame and to the toolbar frame;

at least one interior medial arm being rigidly coupled to the at least one lower medial arm and slidingly coupled to the toolbar frame; and an actuator coupled to the main frame and to the linkage assembly;

wherein the actuator applies a force to the linkage assembly that adjusts a down pressure applied by the row unit to a soil surface during planting operations.

17. The adjustable toolbar system of claim 16, comprising:

a sensor that generates a signal indicative of the down pressure applied by the row unit to the soil surface during the planting operations; and a controller that outputs control signals to the actuator based on the signal to adjust the force on the linkage assembly in adjusting the down pressure applied by the row unit to the soil surface during the planting operations.

18. The adjustable toolbar system of claim 16, wherein the linkage assembly comprises a pin that rotatably couples the at least one upper medial arm to the toolbar frame; and wherein the at least one upper medial arm comprises a slot that slidingly receives the pin.

19. The adjustable toolbar system of claim 18, wherein the actuator applies an additional force on the linkage assembly that adjusts the agricultural implement from a working position to a non-working position, and wherein the pin slides within the slot to enable the agricultural implement in moving from the working position to the non-working position.

* * * * *